United States Patent
Corbett et al.

(10) Patent No.: US 9,442,191 B2
(45) Date of Patent: Sep. 13, 2016

(54) SIGNAL PROCESSING SYSTEM AND METHOD

(75) Inventors: Andrew Corbett, Auckland (NZ); Gregor Storz, Auckland (NZ); Roger Phillips, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 599 days.

(21) Appl. No.: 13/380,151

(22) PCT Filed: Jul. 1, 2010

(86) PCT No.: PCT/NZ2010/000133
§ 371 (c)(1),
(2), (4) Date: Jul. 27, 2012

(87) PCT Pub. No.: WO2011/002316
PCT Pub. Date: Jan. 6, 2011

(65) Prior Publication Data
US 2012/0280854 A1    Nov. 8, 2012

Related U.S. Application Data

(60) Provisional application No. 61/222,378, filed on Jul. 1, 2009.

(51) Int. Cl.
| G01S 13/26 | (2006.01) |
|---|---|
| G01S 13/34 | (2006.01) |
| G01S 7/02 | (2006.01) |
| G01S 7/35 | (2006.01) |
| G01S 7/36 | (2006.01) |

(52) U.S. Cl.
CPC ............... *G01S 13/34* (2013.01); *G01S 7/023* (2013.01); *G01S 7/352* (2013.01); *G01S 7/36* (2013.01); *G01S 2007/356* (2013.01)

(58) Field of Classification Search
CPC ............................... G01S 13/00; G01S 13/36
See application file for complete search history.

(56) References Cited

U.S. PATENT DOCUMENTS

| 6,298,363 B1 * | 10/2001 | Iannuzzelli ................ 708/400 |
| 2007/0040728 A1 * | 2/2007 | Nishimura ............ G01S 13/345 342/70 |
| 2008/0094274 A1 * | 4/2008 | Nakanishi ..................... 342/91 |

\* cited by examiner

*Primary Examiner* — Timothy A Brainard
(74) *Attorney, Agent, or Firm* — Nelson Mullins Riley & Scarborough LLP

(57) ABSTRACT

An FMCW radar system includes received signal processing arranged to apply multiple window functions in parallel to a received beat signal including at least one window function having a narrower main-lobe in its frequency response than at least one other window function and said at least one other window function having relatively higher side-lobe attenuation in its frequency response, transform the output of the multiple window functions from the time domain to the frequency domain, and combine the outputs of the transforms for further processing. Both narrow frequency resolution and thus good range discrimination, and also good side-lobe attenuation to avoid close interference are achieved.

26 Claims, 3 Drawing Sheets

SIGNAL PROCESSING SYSTEM AND METHOD

This application is a 371 of PCT/NZ2010/000133 filed on Jul. 1, 2010, published on Jan. 6, 2011 under publication number WO 2011/002316 A and claims priority benefits of U.S. Provisional Patent Application Ser. No. 61/222,378 filed Jul. 1, 2009, the entire disclosure of which is incorporated herein by reference.

FIELD OF INVENTION

The invention relates to frequency modulated continuous wave radar systems and to signal processing methods to improve range discrimination. The systems in some embodiments may reduce artifacts from interference from other radars.

BACKGROUND

Pulse radar systems transmit impulses of RF energy and measure the time for pulse echoes from the target to return, from which the range to the target is estimated.

Continuous wave (CW) radar systems continuously transmit RF energy and receive back reflection from a target, and provide velocity as well as range information by comparing differences in the transmitted and received waves and using the Doppler effect.

In frequency modulated CW (FMCW) radar systems the continuous wave RF energy is frequency modulated, and the signal reflected from a target mixes with the transmit signal to produce a beat signal from which range may be determined. Usually the beat signal is digitally sampled and then passed through a discrete fourier transform (DFT) in order to determine the frequency spectrum of the beat signal.

Advantages of FMCW radar over pulse radar include low power consumption and emission, high close range sensitivity and resolution, and fast start up time. The low power emission of FMCW radar facilitates its use in small marine vessels and boats. In 2008 the Navico group introduced to the market a range of FMCW radar units for the recreational marine market. An advantage of FMCW radar over CW radar is that CW radar cannot determine range to a stationary target (zero Doppler effect).

The range discrimination of a FMCW radar system is inversely proportional to the bandwidth of the frequency modulated waveform. In practical systems a window function must be applied to the beat signal in order to reduce the effect of frequency (range) side-lobes. This reduction of range side-lobes comes at the expense of a degradation in range discrimination. A window function that provides a high degree of side-lobe reduction will also cause a high-degree of degradation of the range discrimination. Therefore, in practical systems the best case range resolution is not achieved.

FMCW radar systems are also subject to interference from other radars. These radars may include other FMCW radars, pulse radars or pulse compression radars which are operating nearby. A simple technique for removing interference is to blank (e.g. set to zero) the samples of the beat signal where interference is present. However this technique often introduces undesirable artifacts into the signal which can be worse than the original interference.

SUMMARY OF INVENTION

An object of this invention is to achieve improved range discrimination for FMCW radar. An object of at least preferred embodiments of the invention is to achieve both improved range discrimination and improved interference rejection for FMCW radar.

In broad terms in one aspect the invention comprises a system including received signal processing arranged to:
apply multiple window functions in parallel to a received beat signal,
transform the output of the multiple window functions from the time domain to the frequency domain, and
combine the outputs of the transforms for further processing.

In broad terms in another aspect the invention comprises a method of processing a received signal including:
applying multiple window functions in parallel to a received beat signal,
transforming the output of the multiple window functions from the time domain to the frequency domain, and
combining the outputs of the transforms for further processing.

Typically the signal processing system and method of the invention are implemented in an FMCW radar system. In other embodiments the system and method of the invention may be implemented in a sonar system, a medical or non-medical imaging systems, geophysical tomography or other systems in which it to reduce or cancel noise and interference processing generated signal artefacts.

The multiple different window functions may be selected such that one or more of the window functions achieve narrow frequency resolution and thus good range discrimination, while one or more of the window functions achieve good side-lobe attenuation. The combination of the multiple window functions achieves both narrow frequency resolution and good side-lobe attenuation.

Preferably the received signal processing is also arranged to carry out interference removal pre-processing of the received signal before applying the multiple window functions. In one embodiment the received signal processing is arranged to blank the signal to one or some of the window functions when interference occurs while one or some other window functions are applied to the received signal without pre-processing (including signal blanking) In another embodiment the received signal processing is arranged to apply multiple interference removal pre-processing methods in parallel to the received signal and then apply multiple window functions. A different window function may be applied to the output of each of multiple interference removal pre-processing method. The signal processing may apply more interference removal pre-processing methods to the received signal than window functions, or more window functions than interference removal pre-processing methods. Optionally the combining may include combining with the received signal passed through one of the window functions and FFT without interference removal pre-processing, so that in a simplest case where interference removal pre-processing is employed, combining may be of the received signal passed through interference removal pre-processing followed by a window function and FFT, with the received signal passed through one of the window functions without interference removal pre-processing, and FFT.

In broad terms in another aspect the invention comprises a system including received signal processing arranged to:
apply at least one interference removal pre-processing method to a received beat signal or apply multiple interference removal pre-processing methods in parallel to the received beat signal, apply a window function to the output or outputs of the interference removal pre-processing method or methods and a window function to the received beat signal without interference removal pre-processing, or apply a window function or multiple window functions in parallel to the outputs of multiple interference removal pre-processing methods, transform the outputs of the window function(s) from the time to the frequency domain, and combine the outputs of the transforms for further processing.

In broad terms in another aspect the invention comprises a method of processing a received signal including:

applying at least one interference removal pre-processing method to a received beat signal or apply multiple interference removal pre-processing methods in parallel to the received beat signal, applying a window function to the output or outputs of the interference removal pre-processing method or methods and a window function to the received beat signal without interference removal pre-processing, or applying a window function or multiple window functions in parallel to the outputs of multiple interference removal pre-processing methods, transforming the outputs of the window function(s) from the time to the frequency domain, and combining the outputs of the transforms for further processing.

The different interference removal methods may be selected such that interference reduction occurs at different frequencies to the original interference, and noting that different blanking or filtering methods will tend to produce artefacts at different places in the spectrum, to produce a combined result that has low noise.

In broad terms in a further aspect the invention comprises an FMCW radar system including received signal processing arranged to apply multiple window functions in parallel to a received signal, said window functions including at least one window function having a narrower main-lobe in its frequency response than at least one other window function and said at least one other window function having relatively higher side-lobe attenuation in its frequency response, and combine the outputs for further processing.

In broad terms in a further aspect the invention comprises a method of processing a received FMCW radar beat signal including applying multiple window functions in parallel to the received signal, said window functions including at least one window function having a narrower main-lobe in its frequency response than at least one other window function and said at least one other window function having relatively higher side-lobe attenuation in its frequency response, and combining the outputs for further processing.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE DRAWINGS

The invention is further described with reference to the accompanying figures in which.

DETAILED DESCRIPTION OF EMBODIMENTS

Figure 1:
FIG. 1 schematically illustrates conventional interference removal pre-processing, window function, and fast fourier transform stages of the received signal processing of an FMCW radar system, FIG. 2 schematically illustrates an embodiment of received signal processing of the invention, FIG. 3 schematically illustrates a preferred embodiment of the received signal processing of the invention.

In an FMCW radar system bursts of a continuous RF wave are frequency modulated and transmitted. For example each CW burst may be modulated to increase or decrease in frequency from a start frequency to a stop frequency. The continuous wave bursts may be generated by a voltage controlled oscillator to which a voltage ramp is supplied as the modulating signal, or by direct digital synthesis (DDS). Alternatively the modulating wave form may be a saw tooth wave for example. Transmission may or may not occur between the FMCW bursts. The transmitted wave mixes with the signal reflected from a target object to produce a beat signal. Referring to FIG. 1, generally interference removal pre-processing is applied to the received beat signal to remove interference from for example other pulse radars or radar systems operating in the vicinity. Interference removal may be by detecting interference in the received time domain signal and blanking or filtering it in the time domain. The signal is then transformed from the time domain to the frequency domain by fast fourier transform (FFT). Typically the FFT processing is carried out in a DSP or gate array. Since the received beat signal is sampled for a limited measurement time, a window function is applied to the beat signal before the FFT to attenuate frequency side-lobes in the result. The frequency components of the beat signal output of the FMCW receiver are related to the target echoes received. If the beat signal has multiple frequency components indicating multiple targets (the frequencies of the targets are proportional to their range) for example a frequency component at 10 khz and a frequency component at 12 khz indicating two targets, then with a sufficiently narrow frequency resolution the multiple targets, for example the target at 12 khz and the target at 10 khz, can be discriminated. However if the frequency resolution is too wide e.g. greater than 2 khz, the targets cannot be discriminated. In a conventional system as illustrated in FIG. 1, selection of the window function generally involves a trade-off: window functions that retain a narrow frequency (range) resolution have high side-lobe levels whereas it is desirable to have strong side-lobe attenuation to avoid side-lobes from a strong close target swamping the return from a distant target. However window functions that provide high side-lobe reduction also cause high spreading of the main-lobe reducing frequency resolution. The cost of this is a loss of range discrimination.

Figure 2:
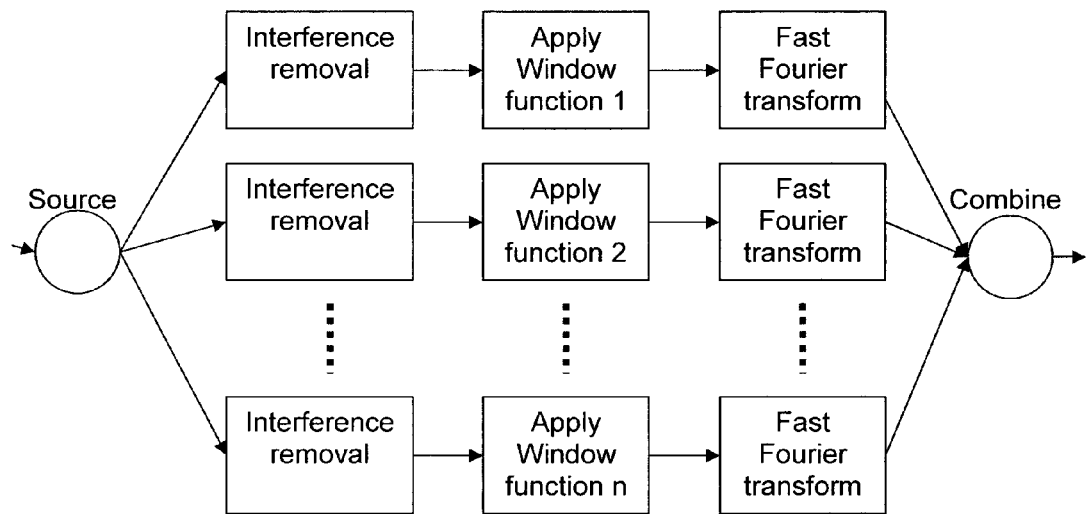

Referring to FIG. 2, in accordance with the invention the received signal is processed in parallel through multiple different window functions having different frequency responses, before FFT and then combining. One or more of the window functions has a relatively narrow frequency resolution while one or more of the window functions has good side-lobe attenuation. The combination of the multiple window functions achieves both narrow frequency resolution and thus good range discrimination, and also good side-lobe attenuation.

Figure 3:
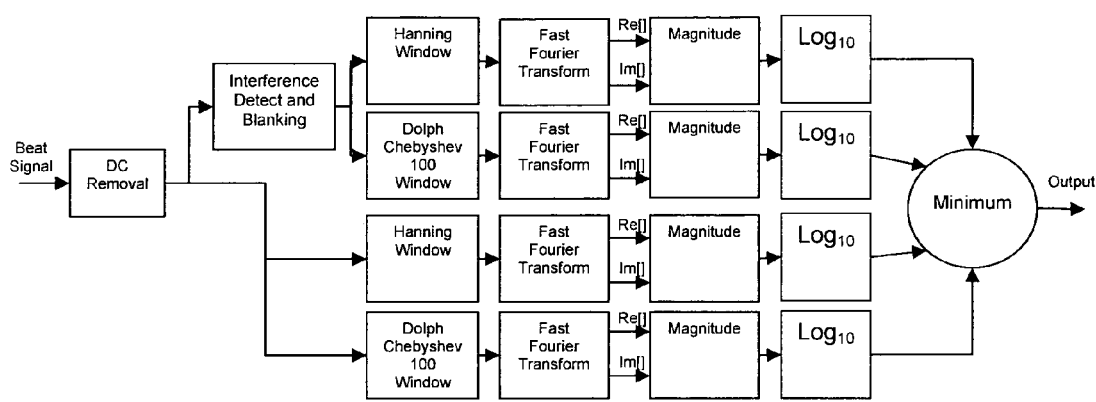

FIG. 3 shows a preferred embodiment of the invention. The received beat signal is first fed through a DC removal stage which removes any DC offset in the signal which would otherwise have a detrimental effect on the output of the FFT at very low frequencies. The beat signal is then processed in four parallel paths, as follows:

Interference blanking is applied followed by a Hanning window function.

Interference blanking is applied followed by a Dolph-Chebyshev 100 window function.

A Hanning window is applied to the beat signal without interference processing.

A Dolph-Chebyshev 100 window is applied to the beat signal without interference processing.

Each of these four parallel paths then undergoes FFT processing. The output of each FFT is an array of complex numbers. Each element of the array represents one frequency bin. The frequency spectrum is obtained by taking the magnitude of the complex FFT outputs. Then the four paths are combined using a "minimum" block. The minimum block simply takes the minimum value for each frequency bin. In a DSP combining may be by taking the minimum value of each frequency bin, or by taking an average value, range dependent ratio, or multiplying the values.

The Hanning window function has a relatively narrow main-lobe, so that its frequency resolution is good. However, the Hanning window has only moderate side-lobe attenuation. The Dolph-Chebyshev window has excellent side-lobe attenuation, but a wide main-lobe. The outputs of the two window functions are combined to produce both good frequency resolution and thus good range discrimination, and good side-lobe attenuation.

In alternative embodiments to those described above the scheme could be implemented for example by using only one FFT block and passing the signal multiple times through that block.

As referred to above, very preferably the signal before processing through each window function is subjected to interference reduction or removal pre-processing. The interference removal pre-processing method may be the same for each window function, or alternatively a different pre-processing method may be applied before each different window function. Blanking or filtering may introduce frequency artefacts into the signal that significantly raise the noise floor post-FFT. Multiple different interference removal methods may be selected such that blanking or filtering occurs at different frequencies to the original interference, and noting that different blanking or filtering methods will tend to produce artefacts at different places in the spectrum, to produce a combined result that has low noise. Optionally also, one or more of the signal copies may be passed through one of the window functions and FFT and combined without interference removal pre-processing as in FIG. 3.

Figure 4A:
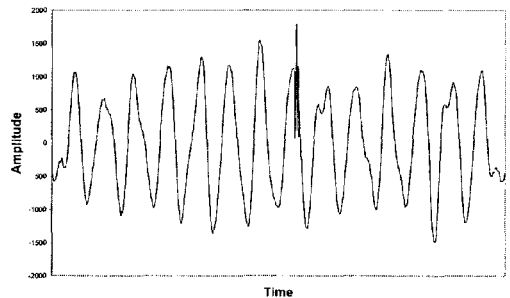
FIGS. 4A and 4B show a received beat signal in the time domain, with interference, and after transformation into the frequency domain, with interference.
Figure 4B:
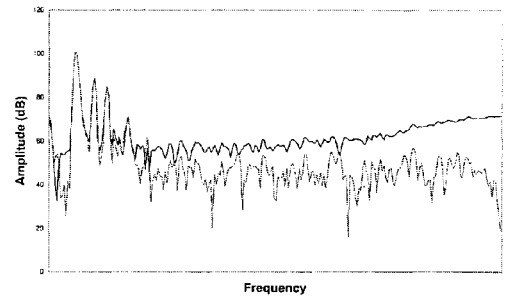

This is illustrated by FIGS. 4A-4E. FIGS. 4A and 4B show a received beat signal in the time domain, with interference, and after transformation into the frequency domain, with interference respectively. In FIG. 4B the darker line (L1) indicates the signal with interference while the lighter line (L2) indicates an interference-free reference. Note the high noise level at high frequencies on the processed signal (L1).

Figure 4C:
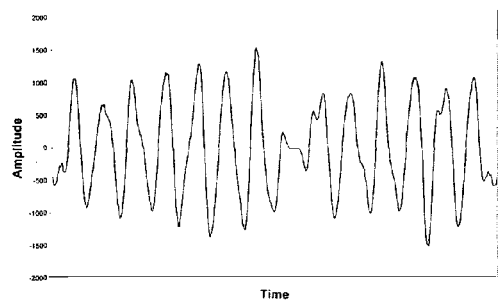
FIG. 4C shows the same signal of 4A in the time domain with the interference blanked.
Figure 4D:
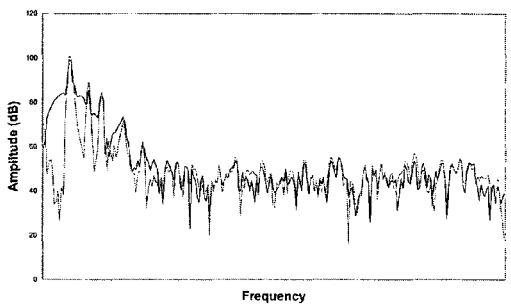
FIG. 4D shows the signal of FIG. 4C transformed into the frequency domain.

FIG. 4C shows the same signal of FIG. 4A in the time domain but with interference blanked, and FIG. 4D shows the signal of FIG. 4B transformed into the frequency domain. In FIG. 4D the darker line (L3) again indicates the processed signal and the lighter line (L4) indicates the interference-free reference. Note the load noise level at high frequencies in FIG. 4D compared to FIG. 4B, but also the smearing of targets at low frequencies in the processed signal in FIG. 4D.

Figure 4E:
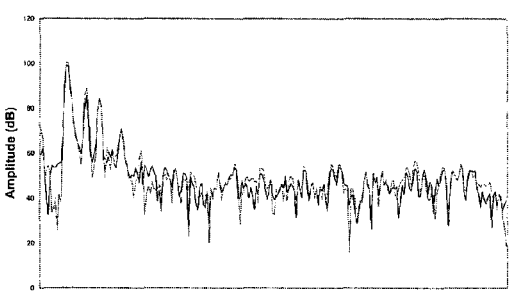
FIG. 4E shows the result of combining the frequency domain signals of FIGS. 4B and 4D.

FIG. 4E shows the result of combining the frequency domain signals of FIGS. 4B and 4D i.e. the signal after two separate processing of "copies" of the signal in parallel, one with interference blanking and one without blanking. The lighter line (L5) shows the interference-free reference and the darker line (L6) the low interference combined signal.

As indicated multiple different interference pre-processing methods and then window functions may be applied in parallel before FFT and combining. Alternatively multiple window functions may be applied to the output of the same or a lesser number of interference removal pre-processing methods or the signal processing may apply more interference removal pre-processing to the received signal than window functions or more window functions and interference removal pre-processing methods. For example n window functions may process signal copies having applied thereto in parallel by less than n such as n/2 interference removal pre-processing methods, such that the output of each interference removal pre-processing method has two window functions applied to it in parallel before FFT and combining. Alternatively n interference removal pre-processing methods may be applied followed by less than n such as n/2 window functions.

The foregoing describes the invention including embodiments thereof. Alternations and modifications as will be obvious to one skilled in the art are intended to be incorporated within the scope hereof as defined in the accompanying claims.

The invention claimed is:

1. A radar system configured to receive a beat signal, wherein the beat signal comprises a transmit signal and a reflected signal from a target, the radar system comprising:
   a first signal processing path configured to:
      receive a first copy of the received beat signal,
      remove interference from the first copy in an interference removal stage of the first signal processing path,
      select at least one window function from a plurality of window functions having different frequency responses,
      apply the at least one window function to an output of the interference removal stage, and
      transform an output of the at least one window function from the time domain to the frequency domain; and
   a second signal processing path configured to:
      receive a second copy of the received beat signal,
      remove interference from the second copy in an interference removal stage of the second signal processing path,
      select at least one window function from a plurality of window functions having different frequency responses,
      apply the at least one window function to an output of the interference removal stage, and
      transform an output of the at least one window function from the time domain to the frequency domain;
   wherein the first and second signal processing paths are parallel signal processing paths,
   wherein the radar system is further configured to combine the outputs of the transforms from the first and second signal processing paths to generate an output beat signal with improved range discrimination and/or reduced interference characteristics, wherein the outputs of the transforms from the first and second signal processing paths each provide a processed copy of the received beat signal to which a unique combination of an interference removal method and window function have been applied relative to the other parallel signal processing path outputs, and wherein the generated processed output beat signal is used to determine a range to the target and discriminate the range to the target from the range to other targets.

2. The radar system according to claim 1 wherein said window functions include at least one window function having a narrower main-lobe in its frequency response than at least one other window function and said at least one other window function has relatively higher side-lobe attenuation in its frequency response.

3. The radar system according to claim 1 wherein the radar system is an FMCW radar system.

4. The radar system according to claim 1 wherein interference is removed via methods that cause interference reduction at different frequencies relative to the original interference.

5. The radar system according to claim 4 wherein interference is removed via interference blanking.

6. The radar system according to claim 1 wherein each of the first and second signal processing paths is configured to remove interference using the same interference removal method, and wherein each of the first and second signal processing paths is configured to select and apply a window function having a different frequency response relative to the other signal processing paths.

7. The radar system according to claim 1 wherein each of the first and second signal processing paths is configured to remove interference using a different interference removal method.

8. The radar system according to claim 1 wherein each of the first and second signal processing paths is configured to transform the outputs from the window functions into the frequency domain by applying a Fast Fourier Transform to generate outputs in the form of an array of complex numbers, each element in the array representing a frequency bin of the frequency spectrum of the signal.

9. The radar system according to claim 8 wherein the radar system is configured to combine the outputs of the transforms from the parallel signal processing paths by selecting the minimum value for each frequency bin from the parallel outputs such that the generated processed output beat signal represents the minimum value from the outputs in each frequency bin.

10. The radar system according to claim 8 wherein the radar system is configured to combine the outputs of the transforms from the parallel signal processing paths by multiplying the values for each frequency bin from the parallel outputs such that the generated processed output beat signal represents the multiplied value from the outputs in each frequency bin.

11. The radar system according to claim 1 wherein the radar system further comprises one or more additional parallel signal processing paths, each additional parallel signal processing path configured to:

receive an additional copy of the received beat signal, remove interference from the additional copy in an interference removal stage of the additional signal processing path, select at least one window function from a plurality of window functions having different frequency responses, apply the at least one window function to an output of the interference removal stage, and transform an output of the at least one window function from the time domain to the frequency domain, wherein the radar system is configured to combine the outputs of the transforms from the additional parallel signal processing paths with the outputs of the transforms from the first and second signal processing paths to generate the processed output beat signal.

12. A method of signal processing a radar beat signal in a radar system, the method including:

receiving a beat signal at the radar system, wherein the beat signal comprises a transmit signal and a reflected signal from a target;

providing a first copy of the received beat signal to a first signal processing path of the radar system and a second copy of the received beat signal to a second signal processing path;

removing interference from the first copy in an interference removal stage of the first signal processing path;

selecting at least one window function from a plurality of window functions having different frequency responses for the first signal processing path;

applying the at least one window function to an output of the interference removal stage of the first signal processing path;

transforming an output of the at least one window function from the time domain to the frequency domain in the first signal processing path;

removing interference from the second copy in an interference removal stage of the second signal processing path;

selecting at least one window function from a plurality of window functions having different frequency responses for the second signal processing path, applying the at least one window function to an output of the interference removal stage of the second signal processing path;

transforming an output of the at least one window function from the time domain to the frequency domain in the second signal processing path; and generating an output beat signal with improved range discrimination and/or reduced interference characteristics by combining the outputs of the transforms from the first and second signal processing paths, wherein the first and second signal processing paths are parallel signal processing paths, wherein the outputs of the transforms from the first and second signal processing paths each provide a processed copy of the received beat signal to which a unique combination of an interference removal method and window function have been applied relative to the other parallel signal processing path outputs, and wherein the generated processed output beat signal is used to determine a range to the target and discriminate the range to the target from the range to other targets.

13. The method according to claim 12 wherein said window functions include at least one window function having a narrower main-lobe in its frequency response than at least one other window function and said at least one other window function has relatively higher side-lobe attenuation in its frequency response.

14. The method according to claim 12 wherein the radar system is an FMCW radar system.

15. The method according to claim 12 wherein interference is removed via methods that cause interference reduction at different frequencies relative to the original interference.

16. The method according to claim 15 wherein interference is removed via interference blanking.

17. The method according to claim 12 wherein the method comprises applying the same type of interference removal pre-processing method in each of the parallel signal processing paths, followed by a window function having a different frequency response relative to the other signal processing paths.

18. The method according to claim 12 wherein removing interference from the first copy in the interference removal stage of the first signal processing path uses the same interference removal method as removing interference from the second copy in the interference removal stage of the second signal processing path, and wherein selecting and applying the window functions in the first and second signal processing paths comprises applying window functions having the same or different frequency responses relative to the other signal processing paths.

19. The method according to claim 12 wherein transforming an output of the at least one window function from the time domain to the frequency domain in the first and second signal processing paths comprises applying a Fast Fourier Transform to generate outputs in the form of an array of complex numbers, each element in the array representing a frequency bin the frequency spectrum of the signal.

20. The method according to claim 19 wherein generating an output beat signal with improved range discrimination and/or reduced interference characteristics by combining the outputs of the transforms from the first and second signal processing paths comprises selecting the minimum value for each frequency bin from the parallel outputs such that the generated processed output beat signal represents the minimum value from the outputs in each frequency bin.

21. The method according to claim 19 wherein generating an output beat signal with improved range discrimination and/or reduced interference characteristics by combining the outputs of the transforms from the first and second signal processing paths comprises multiplying the values for each frequency bin from the parallel outputs such that the generated processed output beat signal represents the multiplied value from the outputs in each frequency bin.

22. The method according to claim 12 further comprising providing an additional copy of the received beat signal to an additional signal processing path of the radar system; removing interference from the additional copy in an interference removal stage of the additional signal processing path; selecting at least one window function from a plurality of window functions having different frequency responses for the additional signal processing path; applying the at least one window function to an output of the interference removal stage of the additional signal processing path; and transforming an output of the at least one window function from the time domain to the frequency domain in the additional signal processing path, wherein generating the output beat signal with improved range discrimination and/or reduced interference characteristics comprises combining the outputs of the transforms from the first and second signal processing paths with the outputs of the transforms from the additional signal processing path.

23. A radar system configured to receive a beat signal, wherein the beat signal comprises a transmit signal and a reflected signal from a target, the radar system comprising:
a first signal processing path configured to:
  receive a first copy of the received beat signal,
  remove interference from the first copy in an interference removal stage of the first signal processing path,
  select at least one window function from a plurality of window functions having different frequency responses,
  apply the at least one window function to an output of the interference removal stage, and
  transform an output of the at least one window function from the time domain to the frequency domain; and
a second signal processing path configured to:
  receive a second copy of the received beat signal,
  select at least one window function from a plurality of window functions having different frequency responses,
  apply the at least one window function to the second copy of the received beat signal, and
  transform an output of the at least one window function from the time domain to the frequency domain;
wherein the first and second signal processing paths are parallel signal processing paths,
wherein the radar system is further configured to combine the outputs of the transforms from the first and second signal processing paths to generate an output beat signal with improved range discrimination and/or reduced interference characteristics, and
wherein the generated processed output beat signal is used to determine a range to the target and discriminate the range to the target from the range to other targets.

24. The radar system according to claim 23 wherein the radar system is an FMCW radar system.

25. A method of signal processing a radar beat signal in a radar system, the method including:
receiving a beat signal at the radar system, wherein the beat signal comprises a transmit signal and a reflected signal from a target;
providing a first copy of the received beat signal to a first signal processing path of the radar system and a second copy of the received beat signal to a second signal processing path;
removing interference from the first copy in an interference removal stage of the first signal processing path;
selecting at least one window function from a plurality of window functions having different frequency responses for the first signal processing path;
applying the at least one window function to an output of the interference removal stage of the first signal processing path;
transforming an output of the at least one window function from the time domain to the frequency domain in the first signal processing path;
selecting at least one window function from a plurality of window functions having different frequency responses for the second signal processing path,
applying the at least one window function to second copy in the second signal processing path;
transforming an output of the at least one window function from the time domain to the frequency domain in the second signal processing path; and
generating an output beat signal with improved range discrimination and/or reduced interference characteristics by combining the outputs of the transforms from the first and second signal processing paths,
wherein the first and second signal processing paths are parallel signal processing paths, wherein the generated processed output beat signal is used to determine a range to the target and discriminate the range to the target from the range to other targets.

26. The method according to claim 25 wherein the radar system is an FMCW radar system.

* * * * *